United States Patent
Green et al.

(10) Patent No.: US 11,299,083 B2
(45) Date of Patent: Apr. 12, 2022

(54) STOWABLE RAMP SYSTEM FOR LIVESTOCK TRANSPORT, AND RELATED METHODS OF USE

(71) Applicant: Opend Range Ltd., Daysland (CA)

(72) Inventors: Douglas Green, Daysland (CA); Norman Noordof, Lacombe (CA)

(73) Assignee: Opend Range Ltd., Daysland (CA)

( * ) Notice: Subject to any disclaimer, the term of this patent is extended or adjusted under 35 U.S.C. 154(b) by 277 days.

(21) Appl. No.: 16/578,279

(22) Filed: Sep. 20, 2019

(65) Prior Publication Data

US 2021/0086681 A1  Mar. 25, 2021

(51) Int. Cl.
  *B60P 1/43*  (2006.01)
  *A01K 1/00*  (2006.01)

(52) U.S. Cl.
  CPC ............ *B60P 1/431* (2013.01); *A01K 1/0035* (2013.01); *B60P 1/433* (2013.01); *B60P 1/435* (2013.01)

(58) Field of Classification Search
  CPC .. B60P 1/431; B60P 1/435; B60P 3/04; B60P 1/433; B65G 69/30; A01K 1/0035
  USPC .................................................. 296/61, 24.31
  See application file for complete search history.

(56) References Cited

U.S. PATENT DOCUMENTS

| | | | | |
|---|---|---|---|---|
| 1,828,551 A | * | 10/1931 | Walters ...................... | B60P 3/04 296/12 |
| 2,179,005 A | * | 11/1939 | Brachear ................ | B65G 69/30 296/61 |
| 2,215,631 A | * | 9/1940 | Young ....................... | B60P 1/43 296/61 |
| 2,228,946 A | * | 1/1941 | Carter ..................... | B60P 1/431 414/537 |
| 2,626,182 A | * | 1/1953 | Troth ........................ | B60P 3/04 296/61 |
| 3,642,156 A | | 2/1972 | Stenson | |
| 3,763,827 A | * | 10/1973 | Burkart .................... | B60P 3/04 119/849 |

(Continued)

FOREIGN PATENT DOCUMENTS

| CA | 1181027 | 1/1985 |
|---|---|---|
| CA | 2388727 | 8/2003 |

(Continued)

OTHER PUBLICATIONS

Images of Wilson Ramp, available at least as early as Aug. 20, 2019, 3 pages.

*Primary Examiner* — D Glenn Dayoan
*Assistant Examiner* — Kevin P Weldon
(74) *Attorney, Agent, or Firm* — Robert A. Nissen

(57) ABSTRACT

An apparatus has: a livestock transport having a floor, walls, ground engaging members, and an access door opening; a ramp; and side panels that are pivotally connected to the walls of the livestock transport, in which the ramp and the side panels are configured to move between: a deployed position where the ramp extends from the access door opening and the side panels cooperate with the ramp to form a livestock loading chute; and a transport position where the ramp is stowed and the side panels are swung about to lie against the walls of the livestock transport. A kit has the ramp and side panels of the apparatus. A method of using the apparatus involves moving the ramp and side panels between the deployed position and the transport position to load, unload, and transport, respectively, livestock.

20 Claims, 7 Drawing Sheets

(56) References Cited

U.S. PATENT DOCUMENTS

| | | | |
|---|---|---|---|
| 4,037,564 A | 7/1977 | Schrock | |
| 4,303,258 A * | 12/1981 | Davis | B60P 3/04 |
| | | | 119/400 |
| 4,439,087 A | 3/1984 | Schink | |
| 4,478,549 A | 10/1984 | Stelly et al. | |
| 4,566,404 A * | 1/1986 | Instone | A01K 1/0035 |
| | | | 119/400 |
| 4,864,673 A | 9/1989 | Adaway et al. | |
| 6,431,815 B1 | 8/2002 | Zarzecki et al. | |
| 6,447,040 B1 | 9/2002 | Young | |
| 6,537,016 B2 | 3/2003 | Bonsall | |
| 6,746,068 B1 | 6/2004 | Hurd | |
| 6,913,432 B2 * | 7/2005 | Bonsall | B60P 3/04 |
| | | | 119/412 |
| 7,152,726 B2 * | 12/2006 | Stotts | B60P 1/435 |
| | | | 193/5 |
| 8,075,033 B1 | 12/2011 | McElroy | |
| 8,302,235 B1 | 11/2012 | Bailie | |
| 8,312,846 B1 | 11/2012 | Murray | |
| 8,562,011 B1 * | 10/2013 | Smith | B60P 3/14 |
| | | | 280/400 |
| 10,104,864 B2 | 10/2018 | Murray | |
| D834,764 S | 11/2018 | Murray | |
| 2002/0102153 A1 | 8/2002 | McElroy | |
| 2004/0140065 A1 * | 7/2004 | Hartmann | E05B 13/002 |
| | | | 160/201 |
| 2005/0055783 A1 | 3/2005 | Peschmann | |
| 2006/0099061 A1 | 5/2006 | Smith et al. | |
| 2006/0191769 A1 * | 8/2006 | Stotts | B60P 1/436 |
| | | | 193/5 |
| 2006/0284439 A1 * | 12/2006 | Carroll | B60P 1/431 |
| | | | 296/61 |
| 2008/0159838 A1 | 7/2008 | Sherer | |
| 2018/0228121 A1 | 8/2018 | Murray | |

FOREIGN PATENT DOCUMENTS

| | | | | |
|---|---|---|---|---|
| CA | 2463990 | | 5/2005 | |
| EP | 1518750 | | 3/2005 | |
| FR | 2842773 | | 12/2002 | |
| GB | 2515825 A | * | 1/2015 | A01K 1/0272 |
| KR | 101539291 B1 | * | 7/2015 | |
| WO | 2012156745 | | 4/2014 | |

* cited by examiner

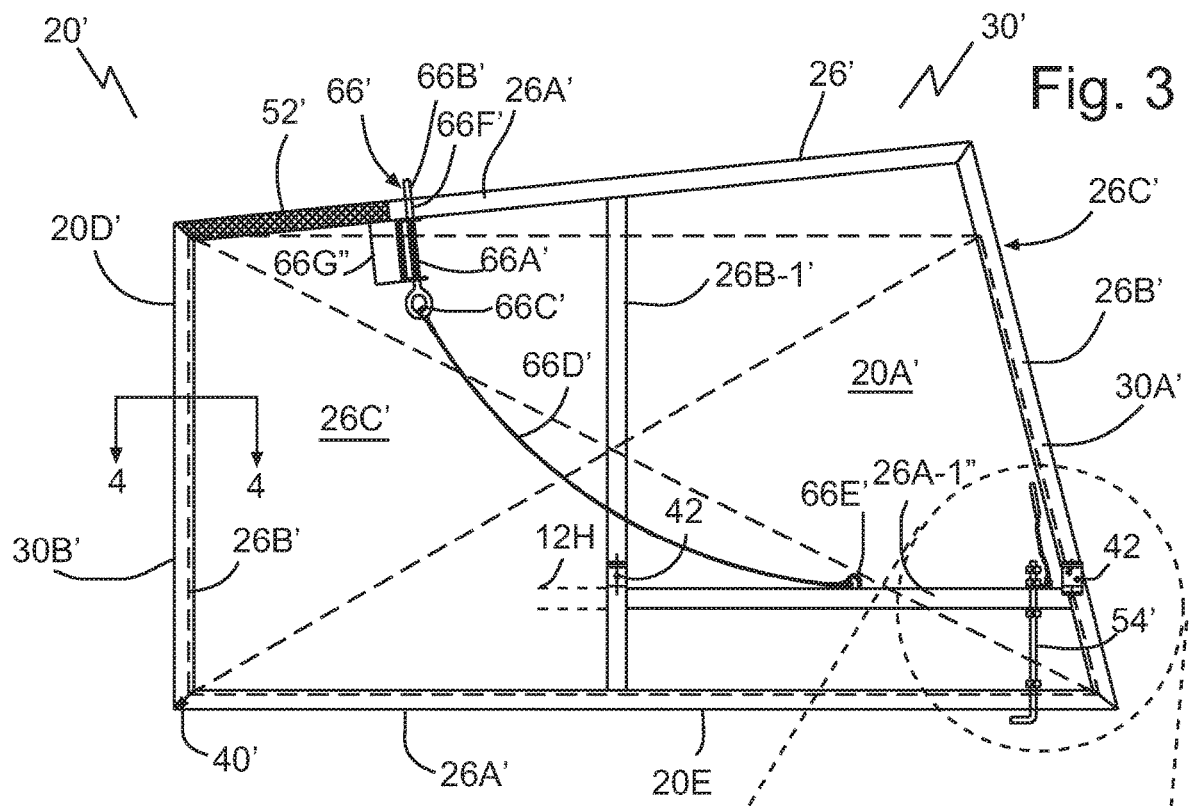
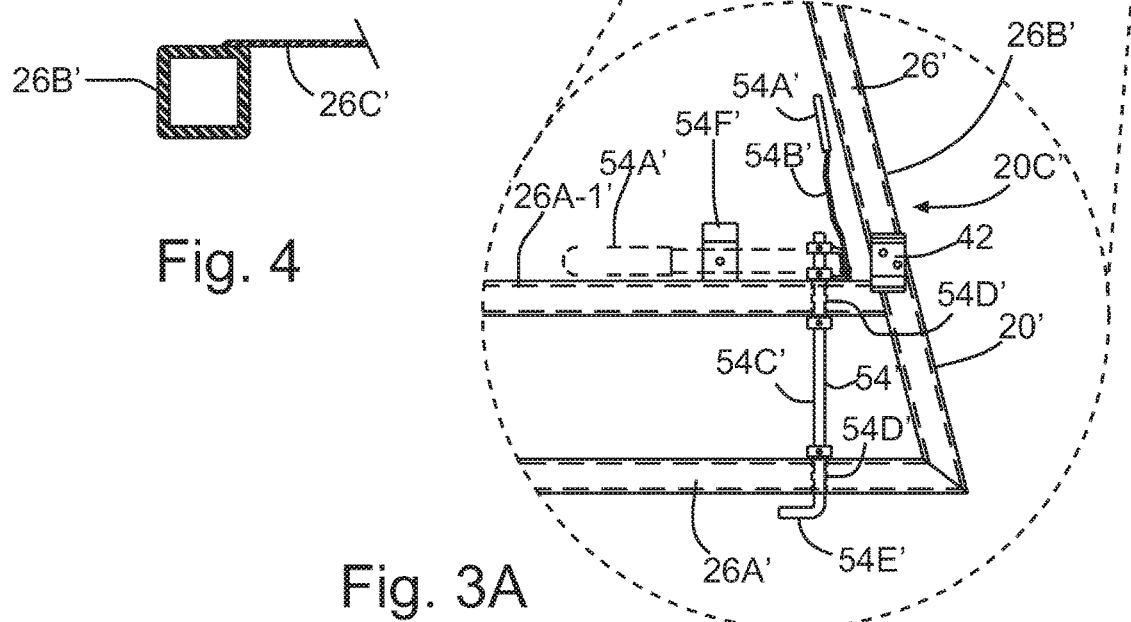

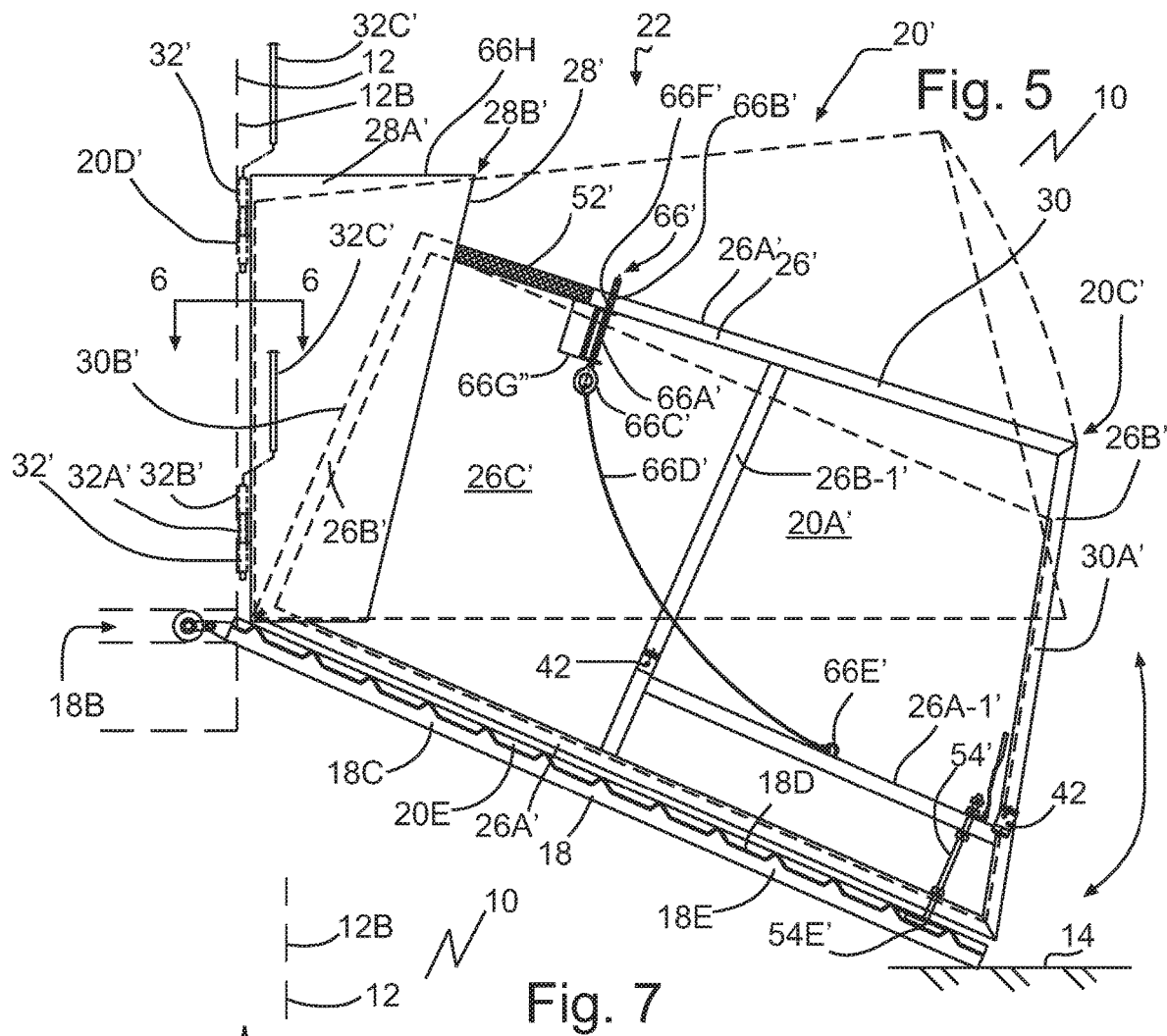
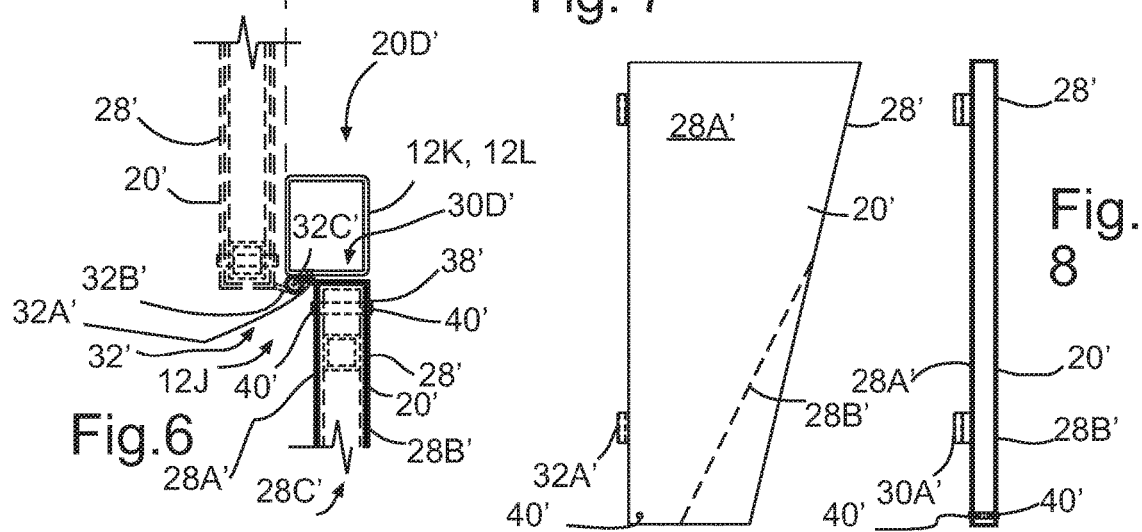

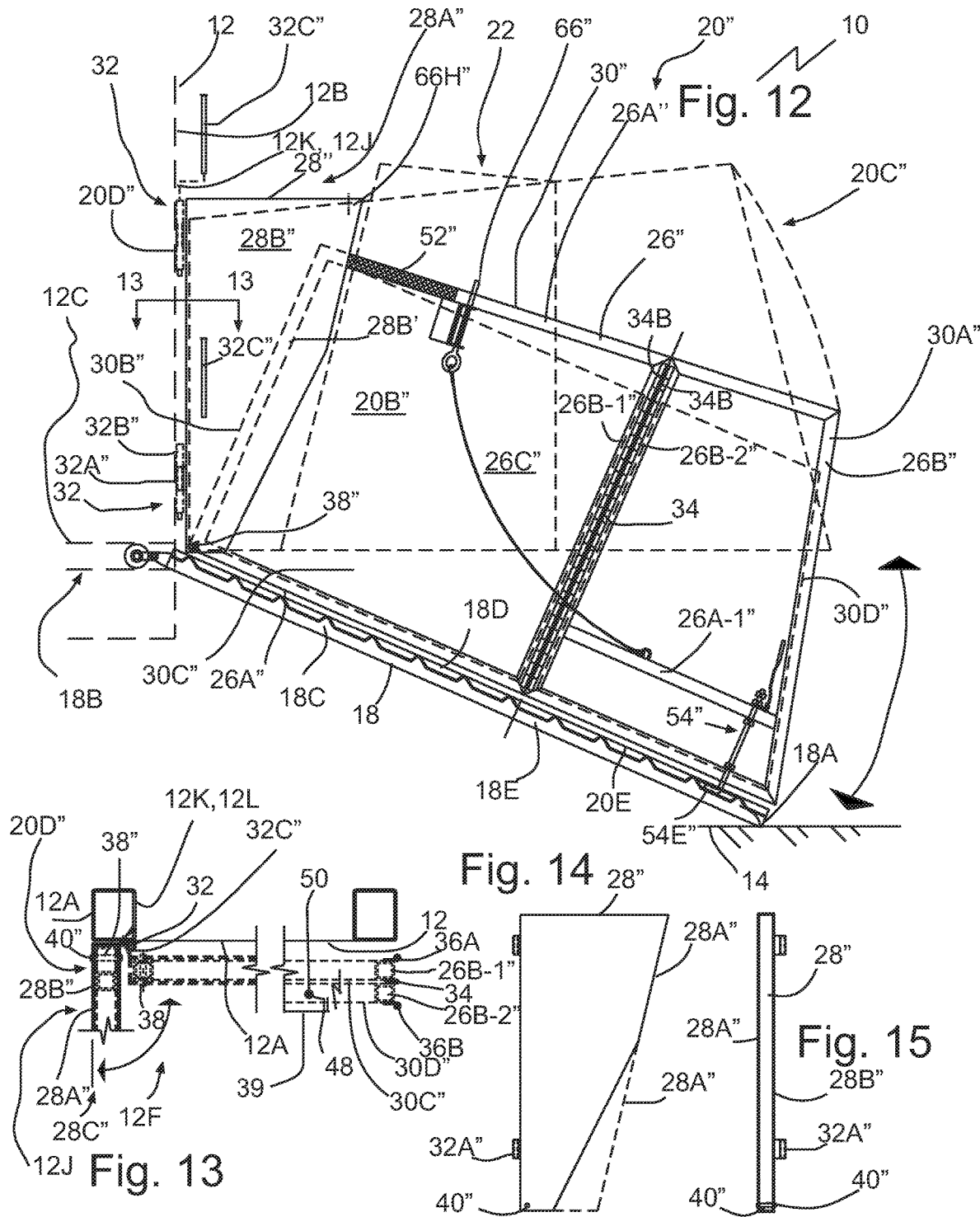

STOWABLE RAMP SYSTEM FOR LIVESTOCK TRANSPORT, AND RELATED METHODS OF USE

TECHNICAL FIELD

This document relates to stowable ramp systems for livestock transport, and related methods of use, as well as kits, and combinations.

BACKGROUND

Livestock, such as cattle, horses, or sheep, may be transported in container units with side or end doors for loading and unloading the livestock. Various ramp systems are used in order to move the livestock safely into and out of the unit. Some ramp systems are located independent of the unit itself, and others are mounted to the unit. Ramp systems are known that mount to the unit itself and stow within or against the exterior of a livestock transport unit.

SUMMARY

An apparatus is disclosed comprising: a livestock transport having a floor, walls, ground engaging members, and an access door opening; a ramp; and side panels that are pivotally connected to the walls of the livestock transport, in which the ramp and the side panels are configured to move between: a deployed position where the ramp extends from the access door opening and the side panels cooperate with the ramp to form a livestock loading chute; and a transport position where the ramp is stowed and the side panels are swung about to lie against the walls of the livestock transport.

A kit comprising the ramp and side panels of the apparatus is disclosed.

A method of using the apparatus comprises moving the ramp and side panels between the deployed position and the transport position to load, unload, and transport, respectively, livestock.

An apparatus is disclosed comprising a livestock transport having a floor, walls, ground engaging members, and an access door opening, the access door opening being located in a rear wall of the walls of the livestock transport; a ramp; and side panels that are pivotally connected to the walls of the livestock transport, in which the ramp and the side panels are configured to move between: a deployed position where the ramp extends from the access door opening and the side panels cooperate with the ramp to form a livestock loading chute; and a transport position where the ramp is stowed, a first side panel of the side panels lies flat against a side wall of the walls, and a second side panel of the side panels folds back over itself and is swung about to lie flat against a rear wall of the walls of the livestock transport.

In various embodiments, there may be included any one or more of the following features: At least one of the side panels is configured to lie against a side wall of the walls of the livestock transport when in the transport position. At least one of the side panels is configured to lie against the rear wall when in the transport position. At least one of the side panels is configured to fold back over itself to lie against the walls when in the transport position. The access door opening is located in a rear wall of the walls of the livestock transport. The side panels are structured to lock to the walls of the livestock transport when in the transport position. The side panels are structured to lock to the walls of the livestock transport using pin locks. The side panels are structured to lock to the ramp when in the deployed position. Lower edges of the side panels comprise ramp locks that engage the ramp when in the deployed position. Ramp locks comprise hooks that are mounted to rotate relative to the side panels to engage hook receivers on the ramp. The ramp is configured to pitch down to engage a ground surface when in the deployed position. The livestock transport defines a track along which the ramp slides to stow the ramp within the livestock transport in the transport position. The ramp comprises rollers or wheels that move the ramp along the track. The rollers or wheels are mounted on a carriage assembly that is pivotally connected to a trailer end of the ramp opposite a ground engaging end of the ramp. Each side panel comprises: a first part that is pivotally connected to a respective wall of the walls to swing into and out of the transport position; and a second part that is pivotally connected to the first part to pitch up and down, relative to the first part, out of and into, respectively, the deployed position. The first parts each have opposed panels that are spaced to receive a portion of the second part in order to guide the second part into and out of the deployed position. The first parts are connected to pivot relative to the walls about a vertical axis and the second parts are connected to pivot relative to the first parts about a horizontal axis. The first part and the second part are structured to lock and unlock to each other. A spring-biased pin lock to lock and unlock the first part and the second part to each other. A door is mounted to slide up and down relative to the livestock transport to open and close the access door opening. The side panels are configured to: connect to the ramp when in the deployed position; and disconnect from the ramp when in the transport position. The ramp is mounted to extend from and retract into the livestock transport between the transport position and the deployed position. The livestock transport comprises a trailer and the ground engaging members comprise wheels. The access door opening is located at a corner of the livestock transport adjacent adjoining walls. At least one of the side panels is pivotally connected to a corner column of the livestock transport between adjacent walls of the livestock transport.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 3 is a side elevation view of one part of a two-part left side ramp of the livestock transport of FIG. 1, with dashed lines used to indicate the profile of cladding on the panel.

FIG. 3A is a close-up view taken along the dashed lines in FIG. 3.

FIG. 4 is a section view taken along the 4-4 section lines in FIG. 3.

FIG. 5 is a side elevation view of both parts of the left side ramp of FIG. 1 in the deployed position, assembled with dashed lines used to indicate a) a raised position of the second part relative to the first part, with the first part anchoring the second part to the livestock transport, b) the profile of cladding on the panel, and c) a movement path of the upper outer corner of the second part.

FIG. 6 is a section view taken along the 6-6 section lines of FIG. 5, with dashed lines used to indicate the orientation of the panel against the transport when in the transport position.

FIG. 7 is a side elevation view of the first part of the left side ramp of FIG. 5, with dashed lines used to indicate an edge profile of an inner face of the first part.

FIG. 8 is an end elevation view of the first part of FIG. 7.

FIG. 12 is a side elevation view of both parts of the right side ramp of FIG. 1 in the deployed position, assembled with dashed lines used to indicate a) a raised position of the second part relative to the first part, with the first part anchoring the second part to the livestock transport, b) the profile of cladding on the panel, c) a movement path of the upper outer corner of the second part, and d) an orientation of the distal panel of the second part of the panel folded back on itself over the proximal panel.

FIG. 13 is a section view taken along the 13-13 section lines in FIG. 12, with dashed lines used to indicate the orientation of the panel when in the transport position.

FIG. 14 is a side elevation view of the first part of the right-side ramp of FIG. 1, with dashed lines used to indicate an edge profile of an outer face of the first part.

FIG. 15 is an end elevation view of the first part of FIG. 14.

DETAILED DESCRIPTION

Figure 1:
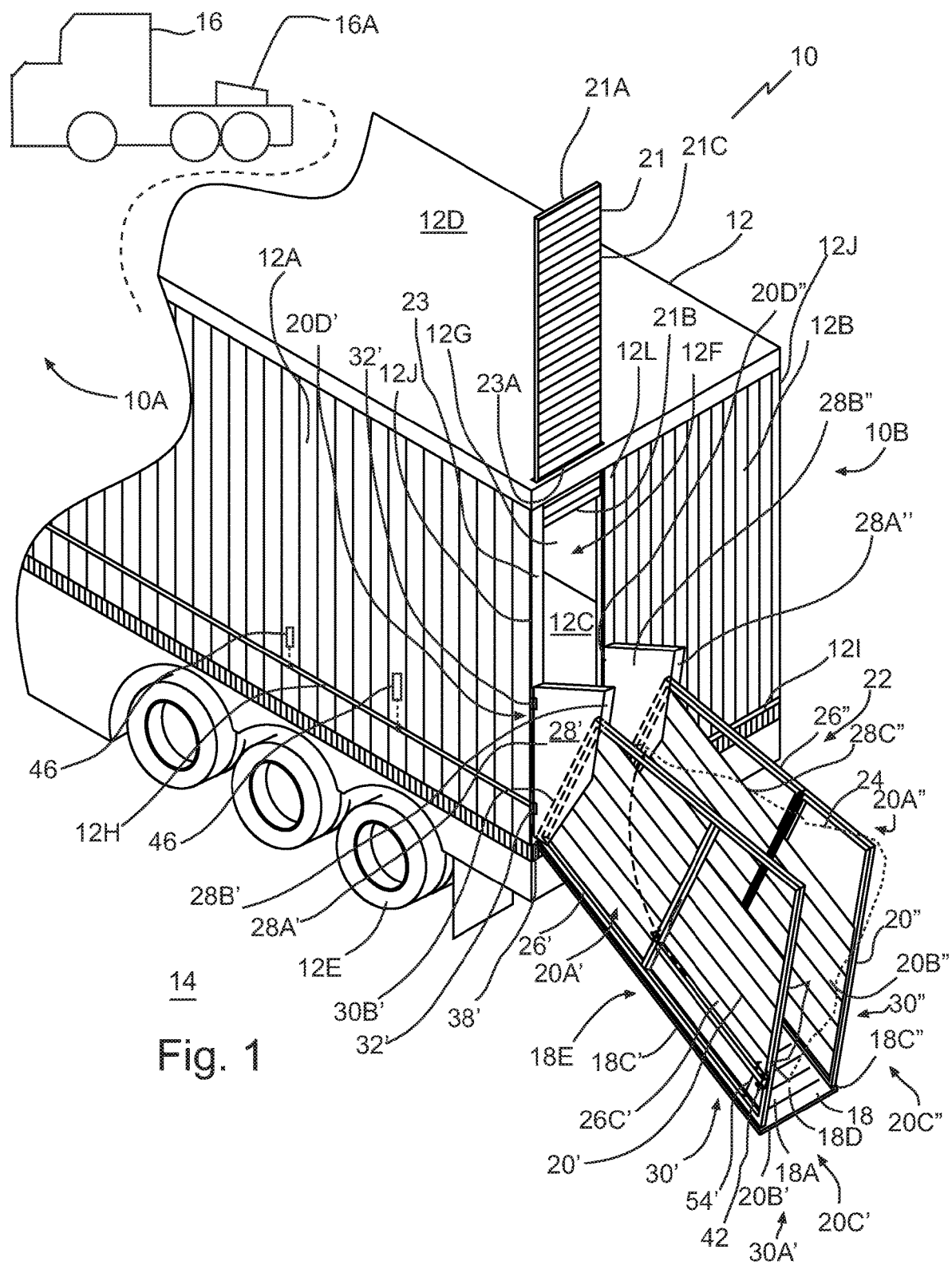
FIG. 1 is a perspective view of a livestock transport provided as a trailer unit with a livestock loading chute in the deployed position, and illustrating a tractor trailer for towing the trailer unit.

Immaterial modifications may be made to the embodiments described here without departing from what is covered by the claims.

In the drawings and description, various parts are identified by reference characters that may incorporate one or more of the suffixes -1, -2, ' or " to indicate that there is more than one type of such part, such as a left and right type of such part. It should be understood that references in this description to a part, whether a suffix is used or not, may refer to parts in the drawing that use the same reference character yet also incorporate a suffix.

Livestock may be defined to include domesticated animals raised in an agricultural setting to produce labor and commodities such as meat, eggs, milk, fur, leather, and wool. The term is sometimes used to refer solely to those that are bred for consumption, while other times it refers only to farmed ruminants, such as cattle and goats, although in this document the term is understood to be as broad as possible, and to include cattle, horses, pigs, sheep, and other animals.

The breeding, maintenance, and slaughter of livestock, known as animal husbandry, is a component of modern agriculture that has been practiced in many cultures since humanity's transition to farming from hunter-gatherer lifestyles. Animal husbandry practices have varied widely across cultures and time periods, and continues to play a major economic and cultural role in numerous communities.

Livestock transportation is the movement of livestock, by ship, rail, road or air. Livestock are transported for many reasons, including slaughter, auction, breeding, livestock shows, rodeos, fairs, and grazing.

The least expensive type of trailer is the stock trailer, a trailer designed for cattle that is enclosed on the bottom, but has slits at roughly the eye level of the animals to allow ventilation. Trailers designed specifically for horses are usually more elaborate. Because horses are usually hauled for the purpose of competition or work, where they must arrive in peak physical condition, horse trailers are designed for the comfort and safety of the animals. They usually have adjustable vents and windows as well as suspension designed to provide a smooth ride and less stress on the animals.

A horse trailer or horse van (also called a horse float in Australia and New Zealand or horsebox in the British Isles) may be used to transport horses. There are many different designs, ranging in size from small units capable of holding two or three horses, able to be pulled by a pickup truck or even a SUV, to gooseneck designs that carry six to eight horses, usually pulled by 1-ton dually-style pickups. There are also large semi-trailers that can haul a significant number of animals. In the UK, a horsebox may also refer to a motorized vehicle adapted to carry horses (generally known as a horse van in North America or Australasia), or a railway vehicle specifically designed to carry horses.

In railroad terminology, a stock car, cattle car, cattle truck or cattle wagon is a type of rolling stock used for carrying livestock (not carcasses) to market. A traditional stock car resembles a boxcar with louvered instead of solid car sides (and sometimes ends) for the purpose of providing ventilation. Stock cars and other livestock transports can be single-level for large animals such as cattle or horses, or they can have two or three levels for smaller animals such as sheep, pigs, and poultry. Specialized types of stock cars have been built to haul live fish and shellfish and circus animals such as camels and elephants.

Over the years, animal transports, such as livestock trailers, have been the subject of numerous improvements and innovations. Modern livestock trailers are commercially available in a variety of sizes and are configured to meet the specialized needs of consumers. Despite the variations in design, most livestock trailers share common characteristics, including, for example, the method by which livestock are loaded into the trailer. Typically, the animals are driven from a corral into a loading chute located on the ground adjacent the corral. Once inside the chute, the animals are directed up a ramp into a rear portion of the livestock trailer. Once loaded, animals are transported to a destination. Unloading of the animals is accomplished at the destination by the reverse of the loading procedure.

Although effective, the above-mentioned method of loading and unloading livestock onto a trailer requires docking the trailer against the chute and ramp. In areas without access to a chute, it may be necessary to load animals directly from the ground. It is generally known in the art of livestock management to use portable ramps and chutes in the transport of livestock. However, chute designs are cumbersome, difficult to move and dangerous to the animals and operator during use. Portable chute designs may be bulky, hard-to-use, complicated, or expensive.

Figure 2:
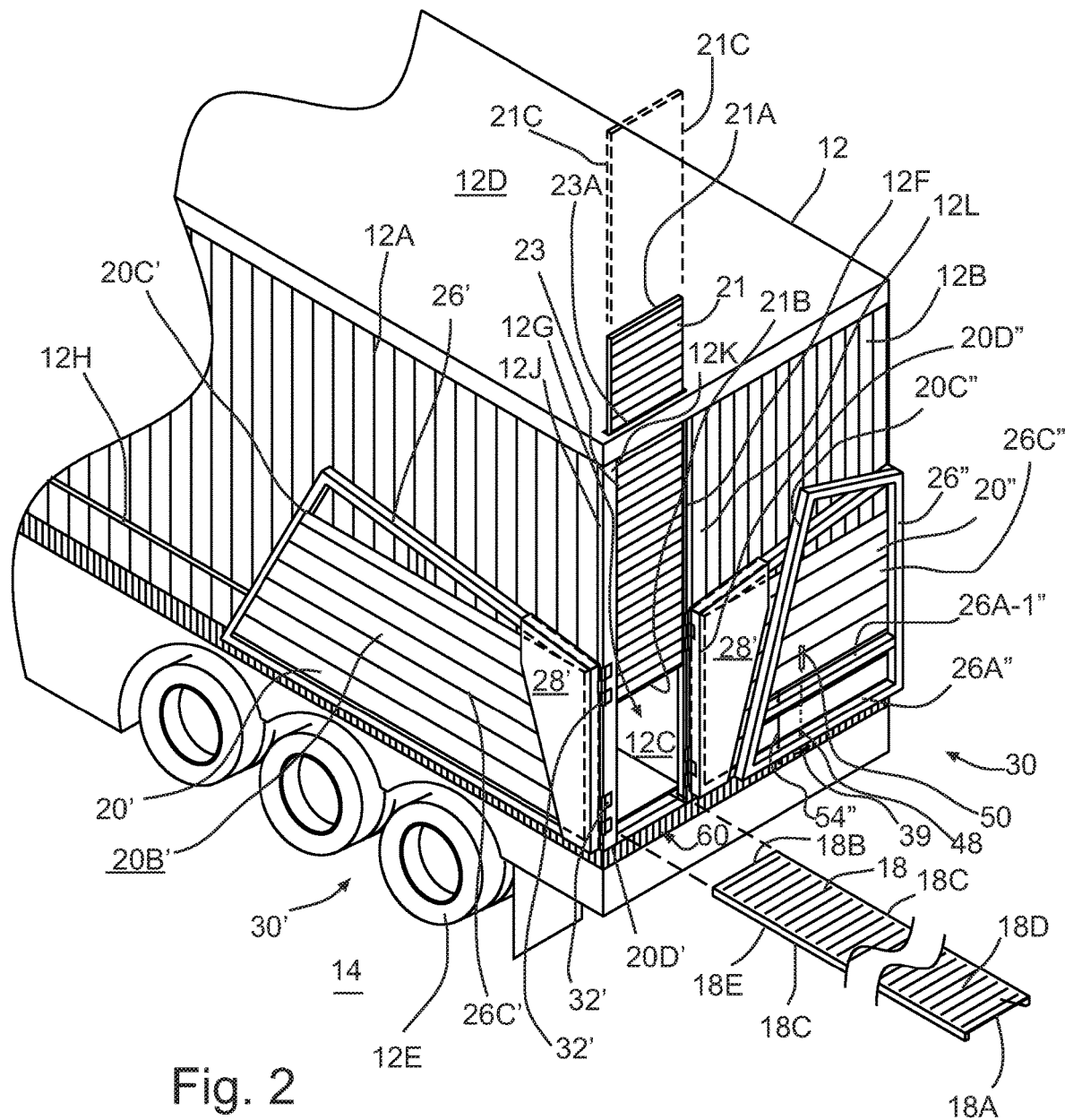
FIG. 2 is a perspective view of the livestock transport of FIG. 1 being moved into a transport position.
Figure 9:
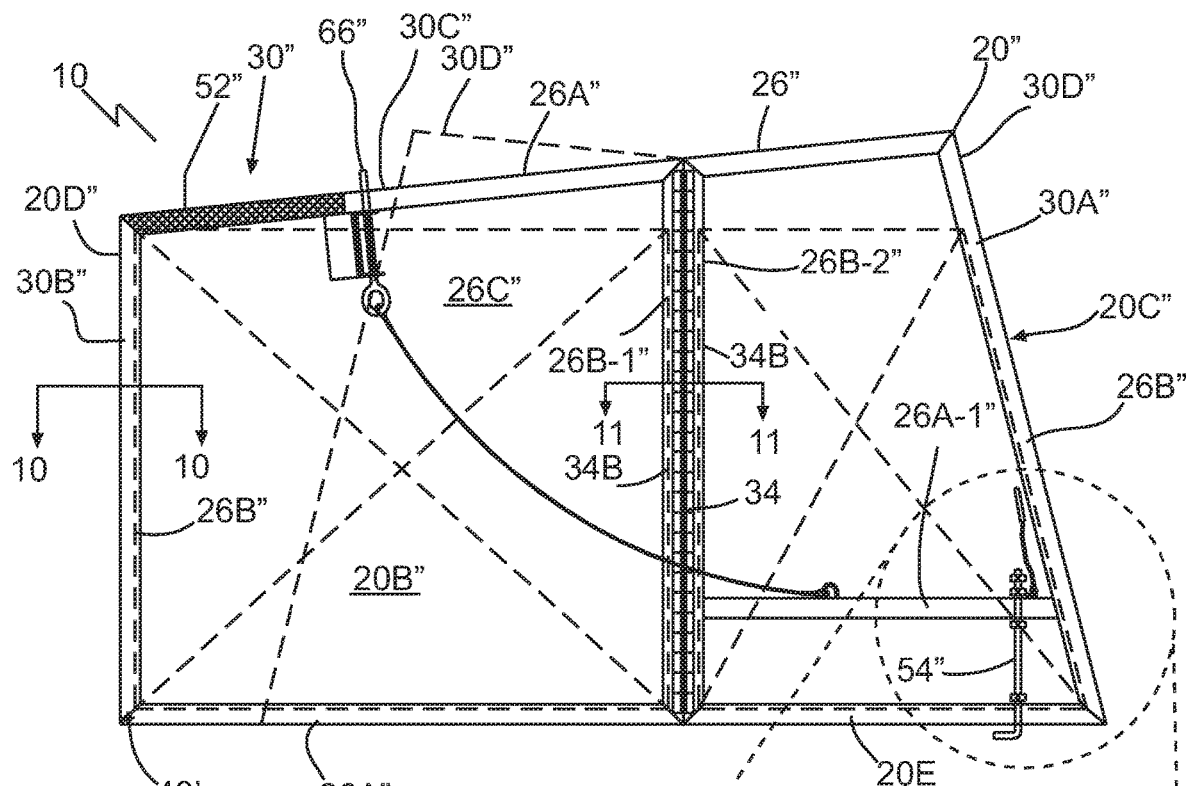
FIG. 9 is a side elevation view of one part of a two-part right-side ramp of the livestock transport of FIG. 1, with dashed lines used to indicate a) the profile of cladding on the panel, and b) an orientation of a distal panel of the second part of the panel folded back on itself over a proximal panel.
Figure 10:
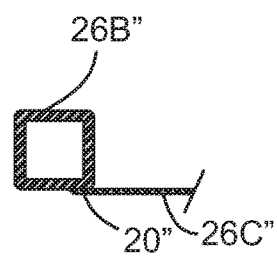
FIG. 10 is a section view taken along the 10-10 section lines in FIG. 9.

Referring to FIGS. 1 and 2, an apparatus 10 is illustrated comprising a livestock transport 12, a ramp 18, and side panels 20 for the ramp. The livestock transport 12 may have a floor 12C, walls, such as side walls 12A and a rear wall 12B, ground engaging members, such as wheels 12E, and an access door opening 12F. The transport 12 may have a roof 12D. The floor 12C, walls, and roof 12D may define an interior 12G in which livestock 24 may be carried during transport.

Referring to FIGS. 1 and 2, the side panels 20 may be pivotally connected to the walls of the livestock transport 12. The various parts of the apparatus 10 may be configured to move between deployed and stowed positions. The side panels 20 may be configured to move between a deployed position (FIG. 1) where the ramp 18 extends from the access door opening 12F and the side panels 20 cooperate with the ramp 18 to form a livestock loading chute 22, and a transport position (FIG. 2) where the ramp 18 is stowed and the side panels 20 are swung about to lie against the walls of the livestock transport 12. The access door opening 12F may be located in a suitable part of the transport 12, such as in a rear wall 12B of the livestock transport 12. When stowed in the transport position, the side panels 20 may be oriented in a compact orientation against the exterior of the transport 12. The side panels 20 may be anchored to the walls of the transport 12, so as to never require removal during transport or deployment.

Referring to FIGS. 1-3 and 9, the side panels 20 may have suitable characteristics. For example, each side panel 20 may be formed in a suitable fashion, such as using a side panel frame 26. Frame 26 may be assembled using suitable structural members, such as tube beams, I-beams, U-beams, angle-beams, slats, or other members. Suitable materials may be used in this and other parts of the apparatus 10, such as aluminum. Suitable structural members include cross members 26A and column members 26B. Each side panel 20 may form a barrier in use to prevent livestock 24 from moving off the sides 18C of the ramp 18. In some cases, side panels 20 may incorporate cladding, such as cladding 26C that covers off gaps between structured members 26A and 26B.

Referring to FIGS. 2, 6, and 13, the side panels 20 may be configured to lie against a suitable wall of the walls of the transport 12. Referring to FIGS. 2 and 6, in some cases at least one of the side panels, such as a first or left side panel 20', is configured to lie against a side wall 12A of the livestock transport 12 when in the transport position. Lying against a wall may include lying in a flat configuration in contact with or in close proximity to a wall, with the panel lying in the same or a parallel plane to a plane defined by the wall, or otherwise following the shape of the wall to hug the wall for a compact configuration. In the example shown, side panel 20' lies flat against the wall 12A along an entire axial length of the panel 20' from end 20C to end 20D.

Referring to FIGS. 2 and 13, in some cases at least one of the side panels, in this case a second side panel 20", is configured to lie against the rear wall 12B when in the transport position. Referring to FIG. 2, in some cases one side panel 20' lies against the side wall 12A, and the other side panel 20" lies against the rear wall 12B when in the transport position. Thus, in some cases at least one of the side panels 20 mounts to one wall but lies flat against an adjacent wall when stowed in the transport position. Such a configuration may be beneficial to allow a side panel to pivot or wrap around a corner 12J of transport 12, rather than simply having all side panels 20 stowed in some fashion against the same wall. Such a configuration may be beneficial when the access opening 12F is located at or near an end wall, such as rear wall 12B.

Referring to FIGS. 2 and 12, the access door opening 12F may be located at a corner 12J of the livestock transport 12 adjacent adjoining walls, in this case walls 12A and 12B. At least one of the side panels, in this case panel 20', may be pivotally connected to a corner column 12K of the livestock transport 12 between adjacent walls 12A and 12B of the livestock transport 12. In other cases, access opening 12F may be located on a side wall 12A, a front wall (not shown), whether spaced at an intermediate location between corners or adjacent a corner.

Referring to FIGS. 1-2, 6, and 13, pivoting action between side panels 20 and walls of the transport 12 may be achieved by a suitable mechanism. Referring to FIGS. 5-6 and 12-13, in the example shown, respective hinges 32 are provided, formed of hinge pins 32C, which pass through aligned apertures in hinge leaves 32A and 32B on the side panels 20 and transport 12, respectively. Hinge leaves 32A of side panels 20 may be located at a suitable location on panels 20, such as along or at trailer ends 20D opposite an outer end 20C of each panel 20. Hinge leaves 32A may be laterally extended away from panel 20, such as along a plane defined by trailer end 20D away from a plane defined by outer side face 20A of the side panel, so as to space the pivot axis of the hinge 32 laterally away from the panel 20 to permit the panel to rotate suitably, for example around a corner 12J of the transport 12. In other cases the hinge 32 (for example the hinge axis) is defined at a corner of the panel 20 to minimize gapping between outer face 20A and walls 12A or 12B when stowed in the transport position for greater compactness when stowing the panel 20.

Referring to FIGS. 2 and 9, 11, 12, and 13, one of the side panels 20 may be configured to fold. In the example shown, at least one of the side panels, in this case side panel 20", is configured to fold back over itself (at least partially) to lie against the rear wall 12B when in the transport position. Allowing the side panel 20" to fold in such a manner addresses a potential issue where the side panel 20" has a length longer than the width of the wall 12B upon which the panel 20" is oriented to lie against.

Referring to FIGS. 2 and 9, 11, 12, and 13, inter panel pivoting may be achieved by a suitable mechanism. In the example shown, a hinge 34 may be provided partway along an axial length of the panel 20", such as between adjacent intermediate column members 26B-1 and 26B-2. Pivoting action between parts of panel 20", in this case between a proximal panel part 30C and a distal panel part 30D (proximal and distal referring to distance from the pivot anchor point for the panel on the transport 12), may be achieved with a suitable pivot mechanism, such as a hinge 34, although other mechanisms may be used, such as a living hinge. The hinge 34 shown is provided by adjoining hinge leaves 34B connected by a hinge pin 34A (which defines a pivot axis). A continuous hinge may be used as shown, for example spanning an axial length or substantial portion of an axial length of the members 26B-1 and 26B-2. In some cases, a side panel 20 may fold around a corner 12J of the transport 12.

Referring to FIGS. 2 and 9, 11, 12, and 13, the panel 20 may fold over itself in a suitable direction and orientation. In the example shown the panel 20 folds in an accordion fashion, with the inner faces 20B of proximal and distal panel parts 30C and 30D folding together in the opposition direction as pivoting about hinge 32, so that distal panel part 30D rests on the proximal panel part 30C in the transport position with proximal panel part 30C between distal panel part 30D and rear wall 12B. In other cases the distal panel part 30D may fold in between proximal panel part 30C and rear wall 12B. In the example shown, parts 30C and 30D fold 180 degrees over one another to lie parallel with one another and with rear wall 12B, in a compact configuration.

Referring to FIGS. 1, 2, 3, and 13, a suitable lock may be used to secure a side panel 20 in place whether in the deployed and/or transport position. For example, referring to FIGS. 1-3, the side panels 20 may be structured to lock to the walls, such as wall 12A, of the livestock transport 12 when in the transport position. In the example shown, panel 20' locks to side wall 12A by one or more pin locks, such as provided by support blocks or brackets 42 on panel 20' cooperating with side rails 12H on side wall 12A to align holes in side rails 12H and bracket 42 to permit a locking pin 46 to be inserted and secure the panel 20' against relative movement out of the transport position.

Figure 11:
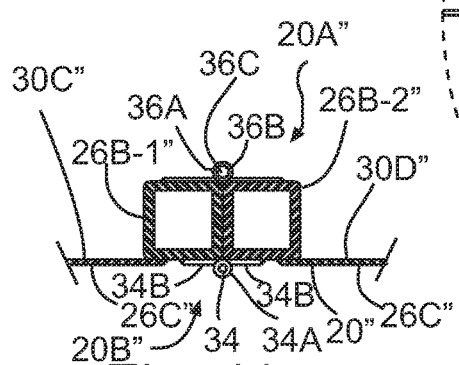
FIG. 11 is a section view taken along the 11-11 section lines in FIG. 9.
Figure 9A:
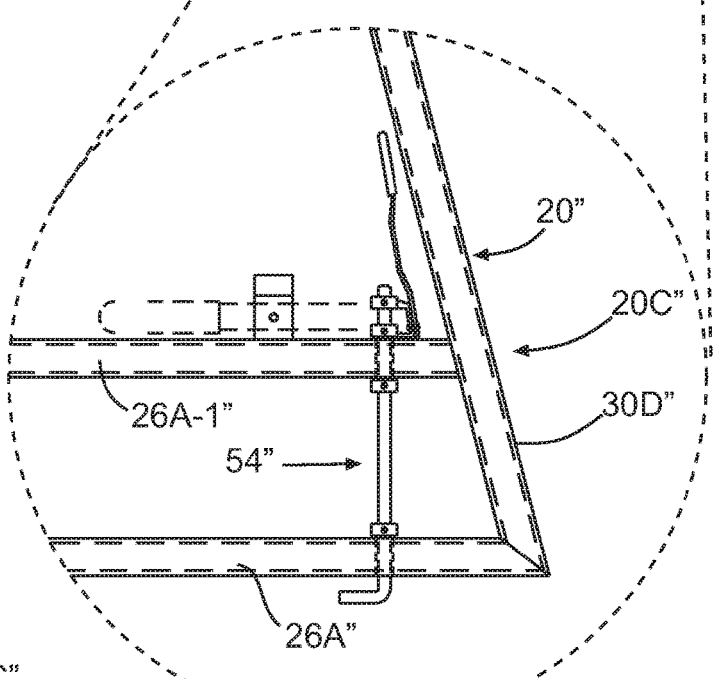
FIG. 9A is a close-up view taken along the dashed lines in FIG. 9.

Referring to FIGS. 2, 11, and 13, suitable locks may be used to secure the side panel 20" in a folded configuration in the transport position. In the example shown, a support block or bracket 39 may extend from rear wall 12B, for example from an end rail 12I (FIG. 1) on wall 12B, and bracket 39 may cooperate with distal panel part 30D to align holes in distal panel part 30D and bracket 39 (only hole 48 in panel part 30D is shown) to receive a lock pin 50 to secure the panel 20" against rear wall 12B. The panels 20 may be secured against walls 12A or 12B in other suitable fashions, such as by lashing the panels 20 to the walls, using cabling, chains, tie-downs, or slings.

Figure 16:
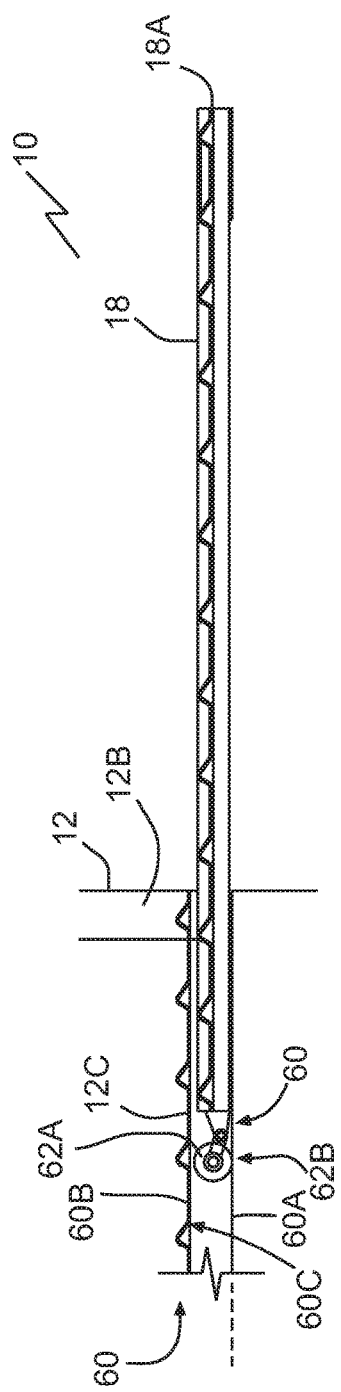
FIG. 16 is a side elevation view of the ramp of FIG. 1.
Figure 17:
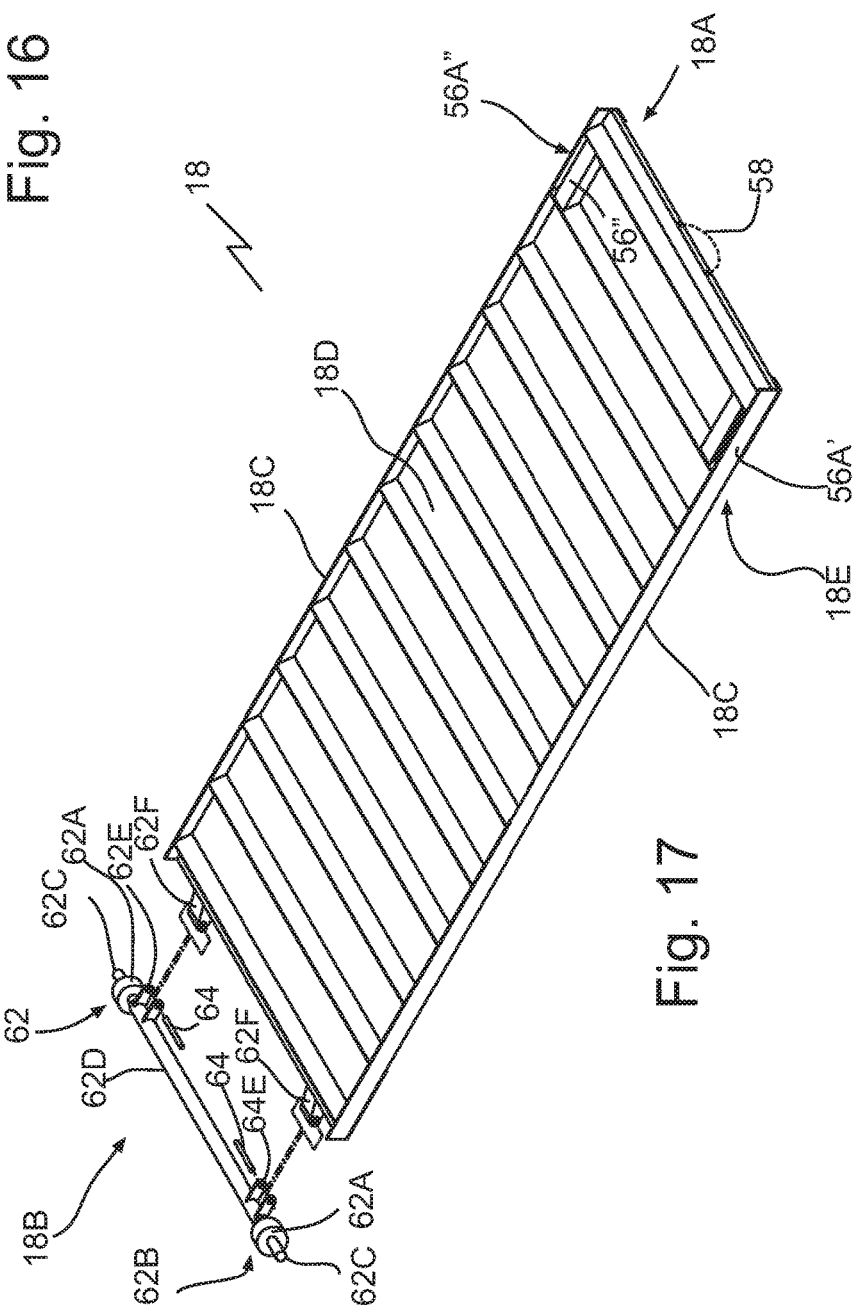
FIG. 17 is a perspective view of the ramp of FIG. 1.

Referring to FIGS. 1, 5, and 16, the ramp 18 and transport 12 may be configured to permit the ramp 18 to extend and retract relative to the transport 12 between deployed and transport positions. In the example shown, the livestock transport 12 defines a track 60 along which the ramp 18 slides to stow the ramp 18 within the livestock transport 12 in the transport position. The ramp 18 may comprise a suitable ramp guide 62, such as rollers 62A or wheels that move the ramp 18 along the track 60. The track 60 may be formed using a false floor, for example to permit the ramp 18 to be stowed below the floor 12C of the transport 12 so as not to interfere with floor 12C space or livestock contained therein in use. The track 60 may be formed by a lower lever 60A, and a roof 60B forming floor 12C, to define a ramp receiving cavity 60C. In some cases the ramp 18 may be configured to carry out a more complex movement, such as a combination of pitching and translating (sliding) movement. One or more of Ramp 18 and floor 12C may be textured or configured to improve traction for livestock, for example corrugated or stepped as shown.

Referring to FIGS. 1, 5, and 16, the ramp 18 may be configured to pitch up or down, for example to one or more of span a gap or change elevation. The ramp 18 may in use while deployed span a gap between the transport 12 and a docking station (not shown) or a ground surface 14, which may require the ramp 18 to pitch up or down as needed. In the example shown, the ramp 18 is configured to swing down to engage a ground surface 14 when in the deployed position. Similarly, when being stowed in the transport position, the ramp 18 may be swung upward, for example to horizontal. Providing ramp 18 in a form that permits adjustability as to pitch allows the ramp 18 and chute 22 to be adapted to different docking stations and situations, including ones where no docking station is present.

Referring to FIGS. 1, 5, and 16, the rollers 62A or wheels may be mounted on a carriage assembly 62B. Assembly 62B may be pivotally connected to a trailer end 18B of the ramp 18 opposite a ground engaging end 18A of the ramp 18. The carriage assembly 62B may permit the ramp 18 to pitch up and down while extending or retracting along track 60. The carriage assembly 62B may permit the ramp 18 to pitch up and down only after pivot arms 62F of ramp 18 clear the ramp receiving cavity 60C, to limit the amount of pitching that can be carried out while the ramp 18 is partially within the track 60. The carriage assembly 62B may have suitable parts, such as an axle, formed by a bar 62C mounted to rotate relative to a sleeve 62D, and mounting rollers 62A. Pivot arms 62E may mate with pivot arms 62F via hinge pins 64 to permit pivoting, for example about a horizontal access as shown.

Referring to FIGS. 1-2, 5, and 12, the side panels 20 may be configured to pitch up and down relative to the transport 12. In some cases, permitting the side panels 20 to pitch up and down allows the side panels 20 to follow the orientation of the ramp 18, for example to match the pitch of the ramp 18. Such may be beneficial for safety, and in some cases particularly when side panels 20 connect to ramp 18 when deployed. In the example shown, a two-part panel 20 may be used to pitch up and down. Each side panel 20 may comprise a first part 28 and a second part 30. The first part 28 may be pivotally connected to a respective wall 12A or 12B of the walls to swing into and out of the transport position. The second part 30 may be pivotally connected to the first part 28 to pitch up or down, for example by scissor action as shown, relative to the first part 28, out of and into, respectively, the deployed position.

Referring to FIGS. 1-2, 5, 6, 12, 13, and 16, the first parts 28 may have a suitable structure. In the example shown, the wall anchor or first parts 28 each have opposed panels, such as outer and inner panels 28A and 28B, respectively, that are spaced to form a panel receiving cavity 28C to receive a portion of the second part 30, such as a trailer end 30B of the second part 30 opposite a trailer end 30B, in order to guide the second part 30 into and out of the deployed position. A suitable mechanism may be used to permit relative pitching, such as using a pivot pin 38 mounted across respective holes 40 in parts 28 and 30. The pivot mechanism may be located at a suitable part of parts 28 and 30, for example at or near a lower corner of the second part 30 adjacent trailer end 30B of the second part 30. The first parts 28 may be connected to pivot relative to the walls about a vertical axis. The second parts may be connected to pivot relative to the first parts about a horizontal axis. Other axes may be used, and in some cases a complex range of movement that includes pivoting and translating may be used. The use of first parts 28 that are formed by panels 28A and/or 28B that taper outward with increasing width toward a top edge of the panels 28A and/or 28B permits the panel 20 itself to retain a consistent barrier from door opening 12F to terminal end 18A of the ramp 18 regardless of the amount of pitch of the ramp 18. The panels 28A and 28B may have a suitable shape, such as a trapezoidal shape. Other parts, such as second parts 30, may have a trapezoidal shape, or other suitable shape.

Referring to FIGS. 3 and 5, the first part 28 and the second part 30 may be structured to lock and unlock to each other. A suitable lock may be provided, such as a spring-biased pin lock 66 to lock and unlock the first part and the second part to each other. In the example shown, lock 66 is provided on the upper cross member 26A of the panel frame 26. The lock 66 may comprise a mounting bracket 66G, which mounts a pin 66B with a spring 66A or other biasing device that biases the pin 66B in a suitable direction, for example to extend pin 66B out of a guide hole 66F in cross member 26A out of the top surface of the cross member 26A. In use, when the second part 30 is pitched upward relative to the first part 28, the pin 66B, whose terminal end may be rounded or beveled to permit contact with first part 28 to depress the pin 66B, eventually aligns with a pin receiving hole 66H in the first part 28, leading pin 66B to insert into hole 66H to lock the parts 28 and 30 together. A suitable mechanism may be provided to release the lock, for example by providing a cable 66D connected between pin 66B and a connection point 66E on cross member 26A-1, to permit a user to pull on cable 66D against the biasing force of spring 66A to withdraw the pin 66B from hole 66H to unlock the parts 28 and 30. The lock may retain parts 30 in a horizontal or other suitable configuration for stowing the second part 30. A protector, such as a neoprene or other soft material pad 52 may be mounted to second part 30, for example to upper cross member 26A to protect the second part against contact with the first part 28.

Referring to FIGS. 1, 3, 3A, 5, 9A, 12, and 17, the side panels 20 may be configured to connect and disconnect from the ramp 18 to form or disassemble the chute 22, respectively. The side panels 20 may connect to the ramp 18 when in the deployed position, and disconnect from the ramp 18 when in the transport position. In the example shown, lower edges 20E of the side panels 20 engage a top surface 18D of the ramp 18.

Referring to FIGS. 1, 3, 3A, 5, 9A, 12, and 17, a suitable locking mechanism may be provided to lock the side panels 20 to the ramp 18 when in the deployed position. A ramp lock may be provided, and may comprise hooks 54E that are mounted to rotate relative to the side panels 20 to engage hook receivers 56A on the ramp 18. In the example shown, panels 56 are provided on top surface 18D of ramp 18, to define slots or other suitable receivers such as panels 56 that receive hooks 54E. Each hook 54E may be controlled and adjusted in a suitable fashion. In the example shown, each hook 54E is mounted on the end of a shaft 54C that extends through cross members 26A of frame 26, via bushings 54D. A handle 54A is provided at the end of a lever 54B that may be carry out both swinging and rotating movements, in order to swung and pitch between a locked position where the handle 54A is secured on a handle bracket 54F on frame 26, to a hook extended position where the hook rotates inward to engage an underside of plates or panels 56 to lock the side panels 20 to the ramp 18. The hook 54E may be a bent pin with locking collars.

Referring to FIGS. 1 and 2, a door 21 may be provided to cover access opening 12F to enclose interior 12G. The door 21 may be provided as part of a transport 12 that is retrofit to include the ramp 18 and side panels 20, so the apparatus 10 or a kit of parts for retrofit to transport 12 may be configured not to interfere with the door 21. The door 21 may be mounted via a suitable mechanism, such as the door 21 may be mounted to slide up and down relative to the livestock transport 12 to open and close the access door opening 12F. When closed, lower end 21B of door 21 may contact floor 12C, while upper end 21A is retained within roof 12D. In the example shown the door 21, particularly sides 21C of door 21, slides along a door track 23, for example defined by door frame columns 12L, and into and out a guide hole 23A in roof 12D of transport 12. In other cases the door 21 may rotate or swing outward, or pitch upward, to open the opening 12F. The door 21 may be provided by ramp 18 in some cases, for example if ramp 18 were mounted to pivot upward to cover access opening 12F during transport.

Referring to FIGS. 1 and 2, the transport 12 may have a suitable structure. In the example shown the transport 12 may be a trailer (such as a semi-trailer) for a tractor truck 16 unit, for example with a fifth wheel 16A or other suitable mounting mechanism to mount the trailer at a front end 10A of the apparatus 10. The ground engaging members may comprise wheels as shown.

In some cases the ramp 18 and side panels 20 may be provided as a kit that can be retrofitted to an existing livestock transport. Retrofitting an existing transport allows the transport to be upgrade to include a portable ramp chute 22 that can then increase the flexibility and range of use of transport 12.

Referring to FIGS. 1 and 2 a method of use will now be described. In one case a livestock transport 12 is brought to a livestock loading location. The transport 12 is parked, and ramp 18 is extended (for example by pulling the ramp 18 out of cavity 60C using chain pull 58) and pitched down to engage ground surface 14 or a docking station. Side panels 20 are unlocked and swung about hinges 32, and thereafter second parts 30 are unlocked from first parts 28 and lowered into engagement with ramp 18. Second parts 30 are locked to ramp 18 by hooks 54E, and door 21 is opened. Livestock is guided up the chute 22 into the interior 12G of transport 12. Once loading is complete, door 21 is closed, and side panels 20 unlocked from ramp 18. Second parts 30 are raised to locate in a stowed position with first parts 28, and panels 20 are rotated and/or folded back against the walls of transport 12, and locked against such walls in the transport position. The transport 12 is then moved to a new location, where the ramp is deployed in the same fashion as above, except that now livestock is guided off the transport 12 via the chute 22. After unloading, the ramp and side panels 20 are stowed in the transport position and the door 21 closed (and locked) as per the procedure above. The methods and structures disclosed here permit a transport to include a portable chute system that stows in a compact fashion and may be deployed in locations that lack a docking station or ramp, or that have an incompatible docking station or ramp.

Use of relative words such as up, down, left, right, vertical, or horizontal are understood to be relative terms not restricted to definitions relative to the direction of gravity on the Earth, unless context dictates otherwise.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiment of the invention in which an exclusive property or privilege is claimed are defined as follows:

1. An apparatus comprising:
   a livestock transport having a floor, walls, ground engaging members, and an access door opening;
   a ramp; and
   side panels that are pivotally connected to the walls of the livestock transport, in which the ramp and the side panels are configured to move between:
   a deployed position where the ramp extends from the access door opening and the side panels cooperate with the ramp to form a livestock loading chute; and
   a transport position where the ramp is stowed and the side panels are swung about to lie against the walls of the livestock transport;
   in which each side panel comprises:
   a first part that is pivotally connected to a respective wall of the walls to swing into and out of the transport position; and a second part that is pivotally connected to the first part to pitch up and down, relative to the first part, out of and into, respectively, the deployed position.

2. The apparatus of claim 1 in which at least one of the side panels is configured to lie against a side wall of the walls of the livestock transport when in the transport position.

3. The apparatus of claim 1 in which at least one of the side panels is configured to lie against a rear wall of the walls of the livestock transport when in the transport position.

4. The apparatus of claim 1 in which at least one of the side panels is configured to fold back over itself to lie against the walls when in the transport position.

5. The apparatus of claim 1 in which the access door opening is located in a rear wall of the walls of the livestock transport.

6. The apparatus of claim 1 in which the side panels are structured to lock to the walls of the livestock transport when in the transport position.

7. The apparatus of claim 1 in which the side panels are structured to lock to the ramp when in the deployed position.

8. The apparatus of claim 1 in which the ramp is configured to pitch down to engage a ground surface when in the deployed position.

9. The apparatus of claim 8 in which the livestock transport defines a track along which the ramp slides to stow the ramp within the livestock transport in the transport position.

10. The apparatus of claim 9 in which:
the ramp comprises rollers or wheels that move the ramp along the track; and
the rollers or wheels are mounted on a carriage assembly that is pivotally connected to a trailer end of the ramp opposite a ground engaging end of the ramp.

11. The apparatus of claim 1 in which the first parts each have opposed panels that are spaced to receive a portion of the second part in order to guide the second part into and out of the deployed position.

12. The apparatus of claim 1 in which the first parts are connected to pivot relative to the walls about a vertical axis and the second parts are connected to pivot relative to the first parts about a horizontal axis.

13. The apparatus of claim 1 in which the first part and the second part are structured to lock and unlock to each other.

14. The apparatus of claim 1 in which a door is mounted to slide up and down relative to the livestock transport to open and close the access door opening.

15. The apparatus of claim 1 in which the side panels are configured to:
connect to the ramp when in the deployed position; and
disconnect from the ramp when in the transport position.

16. The apparatus of claim 1 in which the ramp is mounted to extend from and retract into the livestock transport between the transport position and the deployed position.

17. The apparatus of claim 1 in which:
the access door opening is located at a corner of the livestock transport adjacent adjoining walls; and
at least one of the side panels is pivotally connected to a corner of the livestock transport between adjacent walls of the livestock transport.

18. A method of using the apparatus of claim 1 comprising moving the ramp and side panels between the deployed position and the transport position to load, unload, and transport, respectively, livestock.

19. An apparatus comprising:
a livestock transport having a floor, walls, ground engaging members, and an access door opening;
a ramp; and
side panels that are pivotally connected to the walls of the livestock transport, in which the ramp and the side panels are configured to pivot to move between:
a deployed position where the ramp extends from the access door opening and the side panels cooperate with the ramp to form a livestock loading chute; and
a transport position where the ramp is stowed and the side panels are swung about to lie against the walls of the livestock transport;
in which at least one of the side panels is configured to lie against a side wall of the walls of the livestock transport when in the transport position, and in which at least one of the side panels is configured to lie against a rear wall of the walls of the livestock transport when in the transport position.

20. The apparatus of claim 19 in which the access door opening is located in the rear wall of the walls of the livestock transport.

* * * * *